US008099732B2

(12) United States Patent
Tran et al.

(10) Patent No.: US 8,099,732 B2
(45) Date of Patent: Jan. 17, 2012

(54) SKEW EXCEPTION DETECTION

(75) Inventors: Hoa Tran, Escondido, CA (US); Anita Richards, San Juan Capistrano, CA (US); Douglas Brown, Rancho Santa Fe, CA (US); Choung Kim, Torrance, CA (US)

(73) Assignee: Teradata US, Inc., Dayton, OH (US)

( * ) Notice: Subject to any disclaimer, the term of this patent is extended or adjusted under 35 U.S.C. 154(b) by 1492 days.

(21) Appl. No.: 11/550,150

(22) Filed: Oct. 17, 2006

(65) Prior Publication Data

US 2008/0092142 A1 Apr. 17, 2008

(51) Int. Cl.
*G06F 9/46* (2006.01)

(52) U.S. Cl. ........................................ 718/105; 718/100

(58) Field of Classification Search ........................ None
See application file for complete search history.

(56) References Cited

U.S. PATENT DOCUMENTS

| | | | | |
|---|---|---|---|---|
| 5,280,485 | A | 1/1994 | Blaum et al. | |
| 5,280,533 | A | 1/1994 | Blaum et al. | |
| 5,386,420 | A | 1/1995 | Blaum et al. | |
| 7,496,780 | B2 * | 2/2009 | Abel et al. | 713/503 |
| 2003/0020527 | A1 | 1/2003 | Lin et al. | |
| 2004/0156398 | A1 | 8/2004 | Abel et al. | |
| 2007/0271570 | A1 * | 11/2007 | Brown et al. | 718/105 |

OTHER PUBLICATIONS

U.S. Appl. No. 11/311,747, filed Dec. 19, 2005, H. Tran, et. al.

* cited by examiner

*Primary Examiner* — Kenneth Tang
(74) *Attorney, Agent, or Firm* — Schwegman, Lundberg & Woessner

(57) ABSTRACT

Techniques are presented for skew exception detection within a parallel processing environment. A potential exception is detected when a highest load of a processor within the parallel processing environment exceeds an average load within the parallel processing environment by a given threshold. The potential exception can become a legitimate exception when it exists for a qualified period or time or when it exists and no qualified period of time is noted. In an embodiment, checks for the potential exception occur and are wholly contained within a given configurable interval.

19 Claims, 3 Drawing Sheets

SKEW EXCEPTION DETECTION

FIELD

The invention relates generally to data processing and more particularly to techniques for skew detection associated with parallel processing.

BACKGROUND

A parallel processing environment includes a plurality of processors that cooperate through hardware and software mechanisms to distribute processing and memory load (load balance) amongst the processors of that environment. Such an architecture permits operations to complete more rapidly and more efficiently.

A variety of problems can arise, which may adversely impact the efficiency of the parallel processing environment. One such problem occurs when one processor is more heavily loaded then another processor or when one processor is more heavily loaded than the remaining processors. Conventionally, the trick has been to adequately determine when this type of problem actually occurs or when this type of load balancing problem is actually a true problem situation. This is so, because parallel processing environments are dynamic where conditions change rapidly and frequently.

One solution has been to find the lowest loaded processor and the highest loaded processor and if the differences in load exceed some comparison load value or percentage, the load balancing problem is considered to be present. Yet, in this case it may just be that of 100 available processors within the parallel processing environment one of the processors has little or no work to do, such that there is really not a load balancing problem.

Another solution attempts to detect load balancing issues using statistics accumulated from the start of an operation. Consequently, if a true problem occurs in the middle of the operation it may be delayed or go undetected because the magnitude of the imbalance may be reduced by the accumulated statistics. In other words, the load balancing detection algorithm is more heavily influenced by whether skew calculations use accumulated statistics from the start of an operation or snapshot statistics collected periodically during the operation.

In still another solution, the attempt to detect the load balancing problem occurs using a wall clock. That is, time for the problem to be present before it is considered a true problem is based on elapsed time. However, the effectiveness of using wall clock may be reduced on a busy multi-user system where an operation might not have a chance to run again during the elapsed time.

Thus, it can be seen that improved techniques for load balance detection within a parallel processing environment are desirable.

SUMMARY

In various embodiments, techniques for providing skew detection are presented. In an embodiment, a method is provided for detecting a skew within a parallel processing environment. A request to calculate a skew within a parallel processing environment is received. A first processor is identified as having a highest value for a measured metric with respect to remaining processors within the parallel processing environment. The skew is calculated as a difference value between the highest value and an average value. The average value is determined as an average for the measured metric associated with the first processor and the remaining processors.

DETAILED DESCRIPTION

Figure 1:
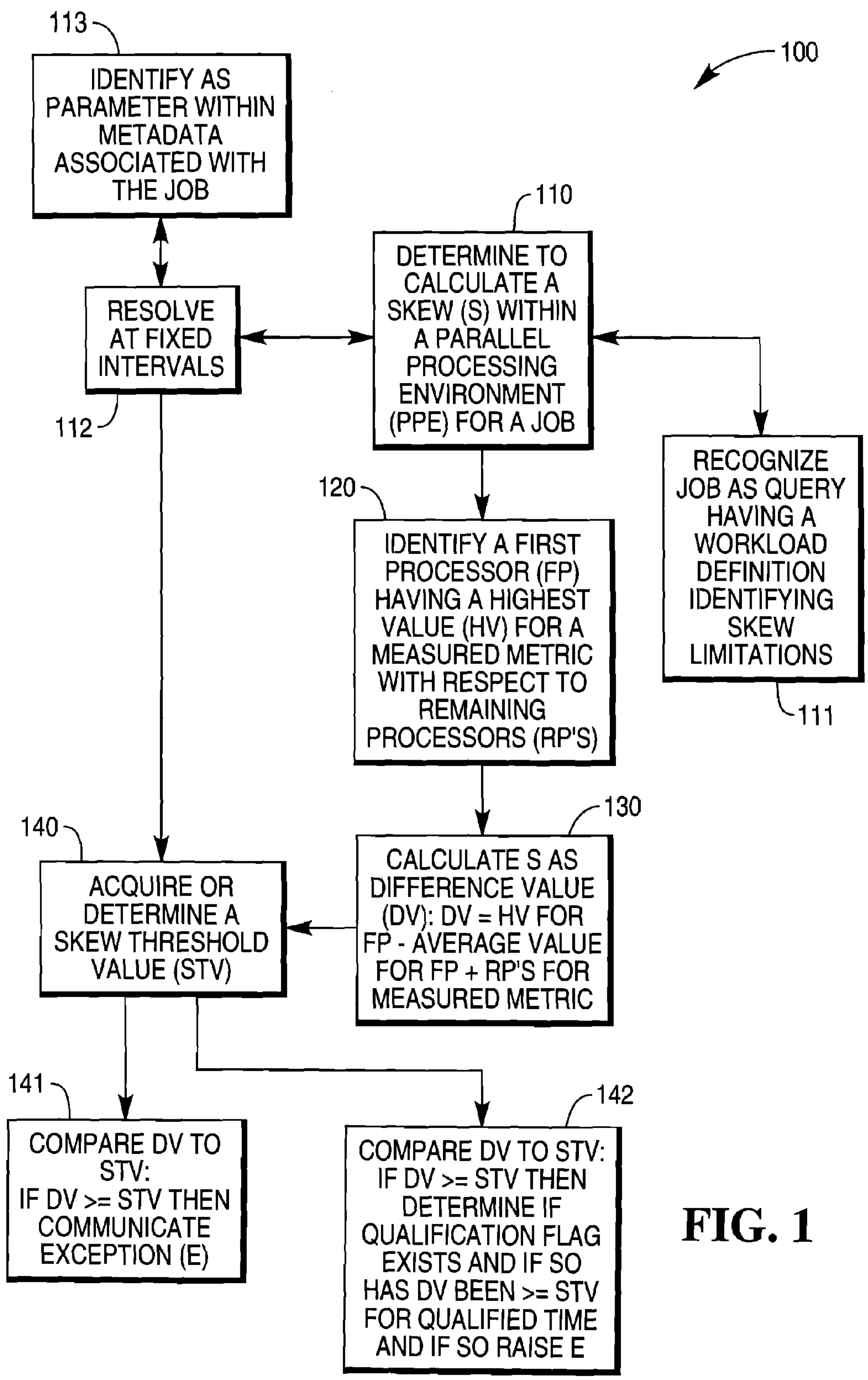
FIG. 1 is a diagram of a method for detecting a skew within a parallel processing environment, according to an example embodiment.

FIG. 1 is a diagram of a method 100 for detecting a skew within a parallel processing environment, according to an example embodiment. The method 100 (hereinafter "detection service") is implemented in a machine-accessible or computer-readable medium as instructions that when executed by a machine (processing device) performs the processing depicted in FIG. 1. The machine includes a plurality of processors and is enabled to perform parallel processing on operations processed within the machine. Moreover, the detection service is accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by NCR Corporation of Dayton, Ohio.

A "data query language" refers to an Application Programming Interface (API) used to access and perform operations on the data store. In an embodiment, the data query language is SQL. Although it is noted that any commercial data query language API or proprietary data query language API may use and benefit from the teachings presented herein with respect to the data query language service.

A "skew" is an indication that a load balancing problem is present within the parallel processing environment. How the skew is determined and resolved is discussed herein and below. Moreover, the skew may be considered a problem in which case an exception is raised to perform rebalancing with the parallel processing environment or it may be considered to not be a problem in which case no exception is raised within the parallel processing environment.

As used herein "job" or "jobs" refers to a series of requests, a single query, or multiple queries being processed by processors within a parallel processing environment. Moreover, an "application" is a series of requests, queries, or a job(s). Thus, when reference is made to "job" or to "application" it may be a query, a series of queries, a request, or a series of data store requests.

Various examples presented herein are discussed in terms of a data warehouse implementation and various components and interactions associated with a parallel processing architecture for the data warehouse. It is to be understood, that this is presented for purposes of comprehension and illustration only as other implementations and parallel processing architectures associated with other systems or services may be used and may benefit from the teachings presented herein and below.

In an example data warehouse and parallel processing architecture, a database system comprises a variety of services or modules that interact with one another for purposes of processing user-based queries or other database related operations. An example of such an architecture may be found in U.S. application Ser. No. 11/311,747; commonly assigned to NCR Corporation of Dayton, Ohio; filed on Dec. 19, 2005; the disclosure of which is incorporated by reference herein.

In the sample architecture, a plurality of access module processors (AMP's) are used to perform operations against and/or on the database system, including by not limited to query operations. Each node of the architecture may include a single or multiple ones of the AMP'S and also includes storage modules that are used for storing information in relational tables associated with the data warehouse.

The sample architecture also includes parsing engines, each parsing engine including a parser and a dispatcher. A parser is used to parse a query (job or application) into executable steps or operations. The dispatcher is used to send the steps to multiple ones of the AMP's for processing or execution.

The query that was broken into discreet steps for processing and that was submitted to the AMP's for processing is also associated with a workload or criteria data structure. This may be viewed as rules or policies for the query and its steps. The criteria may include a variety of information; one type of criteria can identify a skew limit or skew threshold and/or a qualification time or constraint. These are discussed more completely below. A workload can be supplied or modified by the user or an administrator. Additionally, a workload may be associated with classes of queries or other data warehouse applications (coarse grain or global) or with a specific query or data warehouse application (fine grain or local).

As the various discrete sets of query steps are processed on their respective AMP's, the dispatcher or the dispatcher in cooperation with other monitoring services determines whether a skew exception is present using the skew limit of the workload or criteria data structure and/or the qualification time or constraint. To do this, the dispatcher captures metrics (measured metric such as processor load, Input/Output (I/O) load, etc.) at fixed intervals (fixed interval may also be defined in the workload) for the AMP's processing steps of the query.

These measured metrics are used to acquire a skew value and that skew value is compared against the skew limit (skew threshold value defined in the workload). In some cases, a qualification time may also be enforced before a skew is resolved as being a legitimate exception. The manner in which this is done is described more completely below with reference to the FIG. 1 and discussion of the detection service. When a legitimate exception is raised, other workload defined criteria may also be used to resolve what to do with it; alternatively, it may be raised to a load rebalancing service in an attempt to rebalance processing amongst the AMP's of the parallel processing environment.

Within this context, the processing of the detection service is now discussed with reference to the FIG. 1. Using the above example architecture, and in an embodiment, the detection service may be implemented within a dispatcher that distributes and monitors processing steps associated with queries to AMP's of a parallel processing environment.

At 110, the detection service determines that a skew is to be calculated within a parallel processing environment that includes a plurality of processors. According to an embodiment, at 111, the determination to perform the calculation is made in connection with or in response to a data store query issued to a data store and a criteria or rule associated with that query indicating that skew calculations and processing are to be performed.

For example, the detection service may detect that a SQL query (job or application) is being issued to a data store, such as the Teradata® product distributed by NCR Corporation of Dayton, Ohio. When the query is issued, it is broken up into discrete sets of processing steps and distributed to the plurality of processors. Next, a workload definition or rule is detected indicating that the detection service is to monitor skew within the parallel processing environment.

The timing of each skew calculation and other characteristics of the skew calculation may be acquired by the detection service from a metadata structure associated with the job being monitored and processed within the parallel processing environment.

According to an embodiment, at 112, the request may be received at regular fixed intervals. For example, the request may be repeated every N cycles of the machine or every X microseconds or seconds. In some cases, at 113, the fixed interval may be configured within the detection service. For example, the length of the interval may be a processing parameter or profile associated with the detection service or a particular type of job. So, in the example data query illustration, the fixed interval may be defined in the workload definition associated with the query. Additionally, the length of the interval may be manually and dynamically communicated to the detection service. The point is that the fixed interval for which a skew calculation is processed can be configured. That configuration can be for the machine associated with the parallel processing environment as a whole or it can be tailored to specific jobs/applications or specific types or jobs/applications.

At 120, the detection service identifies a first processor from the many processors associated with the parallel processing environment. The first processor is specially designated as such because it is the processor having a highest value for a measured metric being taken by the detection service in response to the determination to perform a skew calculation. The highest value is determined relative to or with respect to each of the remaining processors and values (with respect to the measured metric) for them.

The measured metric may include such things as processing cycles associated with a given processor or Input/Output (I/O) counts for the given processor. Again the precise measured metric may be configured within the parallel processing environment. In some cases the measured metric may be defined with respect to all jobs or applications or tailored to classes of jobs, or even tailored to a specific job.

The detection service determines or acquires values for the measured metric for each of the processors within the parallel processing environment. The processor having the highest value is labeled as the first processor for purposes of subsequent calculations discussed below with respect to determining whether a skew exists within the parallel processing environment.

Accordingly, at 130, and after the values for each of the processors are acquired for the metric being measured, the detection service calculates the skew as a difference value between the highest value associated with the first processor and an average value associated with the first processor and the remaining processors. So, the values for the first processor and the remaining processors (the ones not designated as the first processor) with respect to the metric being measured are averaged to form an average value. The average value is then subtracted from the highest value to result in the skew, which is now identified as a difference value.

Conventional techniques did not approach skew detection in this manner; rather, they elected to compare the highest and lowest values. This may in some cases produce incorrect skew exceptions, especially where most processors were equally as busy and just one or a few were reserved or doing little work because either there was not enough work for them to do or because they were being set aside for other work. Thus, conventional skew detection may not be accurate enough by using a comparison between just the highest and lowest processing loads. The detection service presented herein addresses this concern by comparing the highest loaded processor against an average load. Thus, a few processors doing little to no work will not substantially alter the skew calculation of the detection service.

At 140, a skew threshold value (skew limit) is acquired or determined. The skew threshold value is another metric that is predefined. The skew threshold value may be represented as a percentage or as an absolute value represented as an integer or floating point number. It represents a limit or threshold for determining whether a skew (difference value) is in fact to be considered an exception. The skew threshold value may be defined for a given job (such as a query within its workload definition), for classes of jobs, and/or for the entire parallel processing environment as a whole.

An example skew threshold percentage may be represented as follows:

```
SkewThreshold% = ((Highest_Interval_Machine_Time −
Average_Interval_Machine_Time) * 100) /
Highest_Interval_Machine_Time
```

An example skew absolute threshold integer or floating point value may be represented as follows:

```
SkewThresholdValue = Highest_Interval_Machine_Time −
Average_Interval_Machine_Time.
```

Where each variable in the formulas presented above is assigned values for a measured metric, such as processing cycles or I/O counts.

Other types of skew limits or thresholds may be used and associated with other measured metrics. For example, the skew limit and measured metrics may be associated with CPU to Disk ratios and may then be calculated as: CPU_Disk_Ratio=Total_Interval_CPU_Time/Total_Interval_IO.

In an embodiment, at 141, the detection service compares the skew or difference value against the skew threshold value (skew limit) and when the difference value is greater than or equal to the skew threshold value, the detection service identifies the skew as an exception and communicates the exception. In some cases, the detection service may have rules associated with job or application being monitored that drive the detection service to perform some action in response to the exception. The exception may also, in some situations, be handled by other administrative and load balancing services within the machine of the parallel processing environment for purposes of correcting the skew or load imbalance.

Yet, there may be a variety of other checks made before the detection service fully and completely satisfies itself as to whether or not a true and legitimate exception is to be raised. The conditions by which the detection service determines that a skew is a problem that warrants raising an exception are also configurable. For example, these conditions may be defined in a workload definition for a query being processed by a dispatcher that includes the detection service or is interfaced to the detection service.

One example, at 142, determines that an exception exists if the skew or difference value exceeds or equals the skew threshold value and if a qualification flag is set. When the qualification flag is detected, the detection service does not raise or subsequently process the exception unless the skew is present for a qualified period of time or processing cycles associated with the machine of the parallel processing environment. So, the skew differential with the skew threshold (skew limit) is not viewed as problematic unless it is present for a qualified period or duration.

This can be detected by setting a flag for the skew and rechecking for the skew differential at subsequent intervals. The qualification time in terms of the CPU time (or processing cycles) is accumulated from the first skew detection. If the skew threshold is consistently exceeded during a number of consecutive intervals and the qualification time is also exceeded, then a true exception is raised or noted.

Moreover, the measurements of time may be based on CPU time or machine time associated with the machine of the parallel processing environment. In this manner, other issues occurring within the machine may not influence the skew exception detection, since the measurement of time is being taken from the perspective of the machine's overall processing cycles and not based on wall clock.

Figure 2:
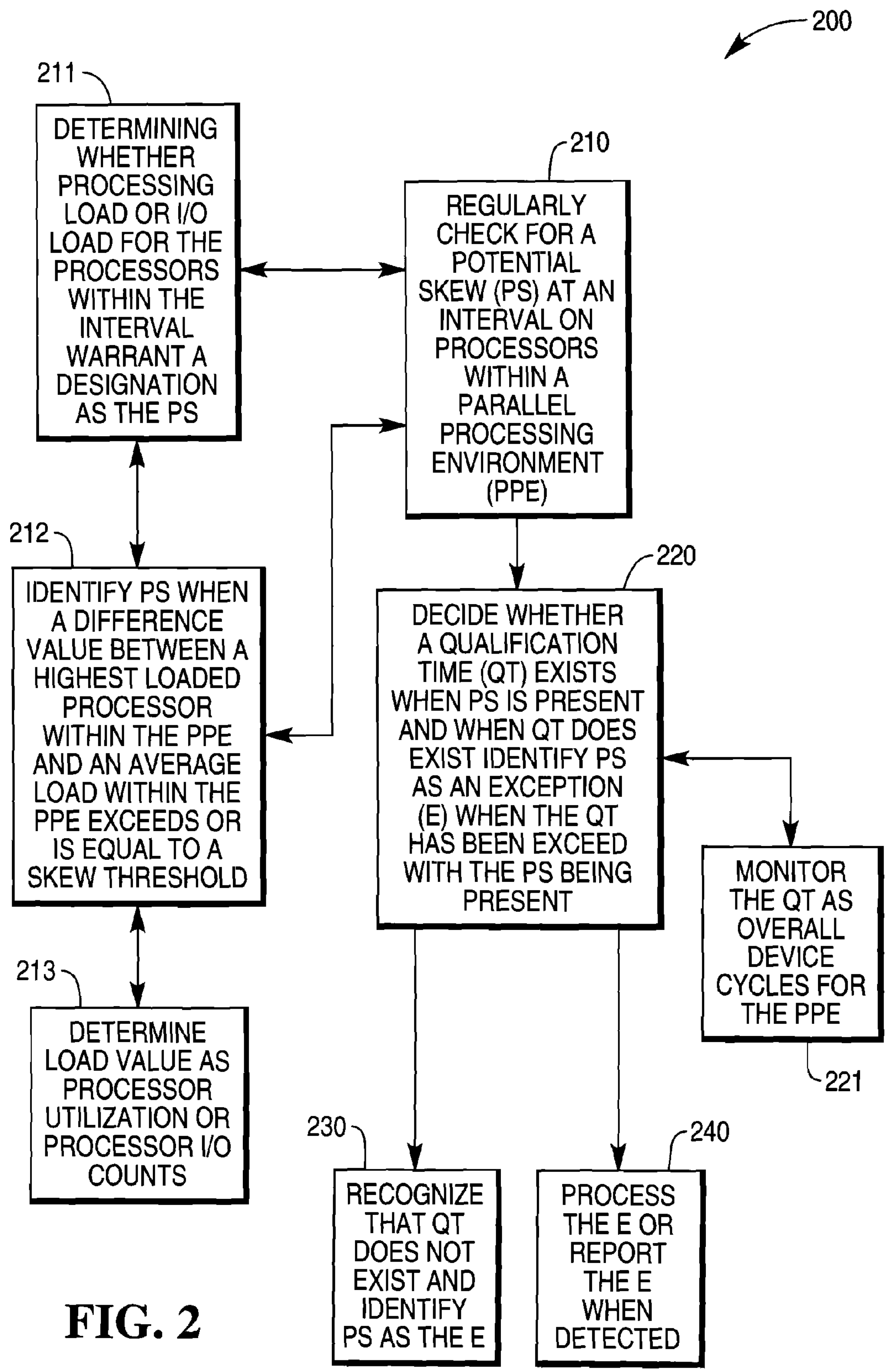
FIG. 2 is a diagram of another method for detecting a skew within a parallel processing environment, according to an example embodiment.

FIG. 2 is a diagram of another method 200 for detecting a skew within a parallel processing environment, according to an example embodiment. The method 200 (hereinafter "skew detection service") is implemented in a machine-accessible and readable medium as instructions that when executed by a machine performs the processing reflected in FIG. 2. The machine that executes the skew detection service includes a plurality of processors and performs parallel processing on jobs or applications that process on the machine. Moreover, the skew detection service may also be accessible over a network. The network may be wired, wireless, or a combination of wired and wireless.

Furthermore, the skew detection service presents an alternative view of the detection service represented by the method 100 of the FIG. 1.

At 210, the skew detection service regularly checks for a potential skew at an interval on processors within the parallel processing environment. The interval is predefined and may be passed as a profile, rule, or other metadata associated with a job or application being monitored within the machine; may be passed as runtime parameters to the skew detection service; or may be preconfigured as a profile or configuration associated with the skew detection service. The interval is measures as Machine or CPU time and not as wall clock time.

According to an embodiment, at 211, the skew detection service determines whether the processing load (processor cycles) or the I/O load (I/O counts) for the processors within the interval warrant a designation as being labeled as a potential skew.

At 212, the skew detection service calculates or identifies any potential skew as a difference value between a highest loaded processor within the parallel processing environment and an average load within the parallel processing environment. The difference value is then compared to skew threshold either on an absolute value or percentage value basis. If the difference value exceeds or equals the skew threshold (skew limit) then the skew detection service determines that it is or may be (after subsequent evaluation) a legitimate skew instead of just a potential skew at this point. Again, the skew limit may be determined from rules or metadata definitions associated with the job being monitored.

Moreover, at 213, the skew detection service may determine the loads as either processing cycles for the processors within the parallel processing environment or as I/O counts for the processors within the parallel processing environment. In some cases, combinations of processing cycles and I/O counts may be used as well.

At 220, the skew detection service decides whether a qualification time exists when a potential skew is present. This may be identified via a flag or some other profile or setting associated with the skew detection service as a whole or with a particular job/application (such as within the workload definition for a query) or specific type or job/application. If a qualification time does exist, then the skew detection service determines that an exception has occurred when the qualification time has been exceeded and the potential skew remains.

In an embodiment, at 221, the skew detection service may monitor the qualification time or measure it in terms of overall machine or device cycles associated with the parallel processing environment. So, the qualification time is not measured in terms of wall clock.

In one situation, at 230, it may be that the qualification flag or time does not exist or is not a limitation or condition upon which the skew detection service uses to determine if the potential skew is a true exception. In such a situation, the skew detection service may identify the potential skew as the exception and raise or communicate it accordingly within the parallel processing environment.

At 240, when a true or legitimate exception is determined to be present from the potential skew, the skew detection service may perform predefined processing (defined for the job or application being monitored) or may report the exception within the parallel processing environment for purposes of causing a load balancing service to rebalance and correct the problem.

The skew detection service determines whether a skew is an exception by taking a difference between a highest load for a highest loaded processor and an average load for remaining processors; by comparing the difference to a threshold or limit within an interval; by determining whether the difference with the threshold exists for a qualified period of time; and by measuring time in terms of machine or CPU time and not in terms of wall clock.

Figure 3:
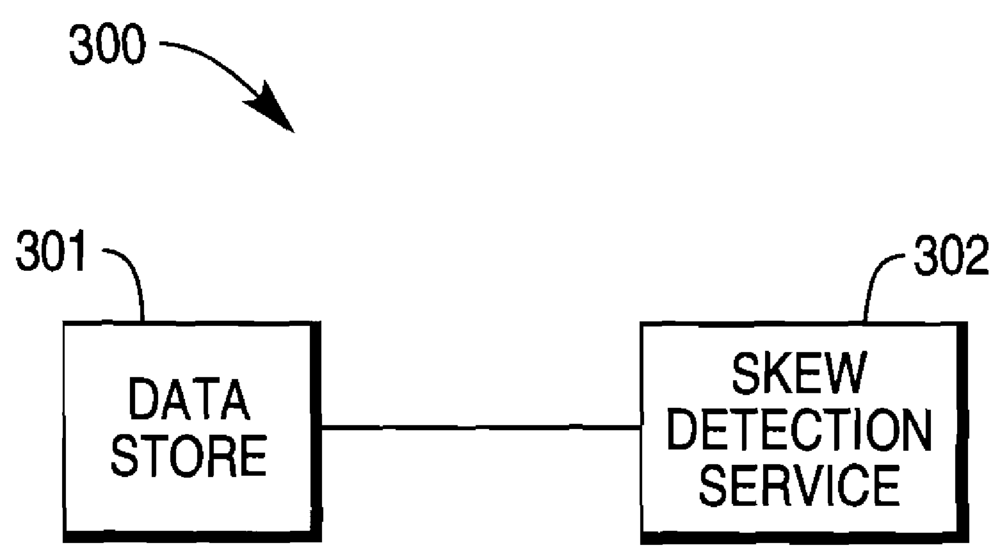
FIG. 3 is a diagram of parallel processing skew detection system, according to an example embodiment.

FIG. 3 is a diagram of parallel processing skew detection system 300, according to an example embodiment. The parallel processing skew detection system 300 is implemented in a machine-accessible and readable medium and is operational over a network. The network may be wired, wireless, or a combination of wired and wireless. The machine includes a plurality of processors and is enabled to perform parallel processing on jobs and applications executed within the machine. In an embodiment, the parallel processing skew detection system 300 implements, among other things the detection service and the skew detection service represented by the methods 100 and 200 of the FIGS. 1 and 2, respectively.

The parallel processing skew detection system 300 includes a data store 301 and a skew detection service 302. Each of these will now be discussed in turn.

The data store 301 is relational database, a directory, a data warehouse, a collection of files, or combinations of these. The data store 301 includes a data query language, such as SQL. The data query language is used within the parallel processing environment to issue applications or jobs against the data store 301.

For example, suppose a rather large query job is being performed on Teradata® data warehouse (data store 301); such that portions of the query are associated with multiple distinct tables and operations on those tables. This type of job could be broken up into discrete sets of processing steps, such that each set of processing steps can be directed to a unique processor thereby permitting the entire job to finish more efficiently and rapidly via parallel processing techniques. Example modules and architecture for this situation was discussed above with reference to the method 100 of the FIG. 1.

Jobs/Applications on the data store 301 are detected by the skew detection service 302. Example processing associated with the skew detection service 302 was presented above with respect to the methods 100 and 200 of the FIGS. 1 and 2. Essentially, the skew detection service 302 is configured or capable of being dynamically instructed to monitor certain jobs/applications occurring on the data store 301, to monitor each job/application occurring on the data store 301, or to monitor certain types of jobs/applications occurring on the data store 301. This can be done via rules or metadata associated with the jobs/applications or classes of jobs/applications, where those rules instruct the skew detection service to monitor and perform skew calculations and skew detection processing.

Once it is determined that a job/application is to be monitored for the data store 301, the skew detection service 302 performs one or more checks to determine if an exception occurs during a lifecycle associated with the job/application being monitored. The exception reflects a skew or imbalance with loads associated with processors of the parallel processing environment. Each check uses a calculated potential skew value as a difference between a highest loaded processor and an average load for remaining processors within the parallel processing environment.

When the potential skew value is know it is compared against a skew threshold value. That comparison may be on a percentage value basis or an integer or floating point value basis. Again, the skew threshold value (skew limit) may be defined in rules or other metadata associated with the job/application being monitored.

The skew detection service 302 recognizes the potential skew value as an exception if it exceeds or is equal to the skew threshold value and if no qualified time limitation is present. When a qualified time limitation is present, the skew detection service 302 determines within the interval being evaluated whether the potential skew value exceeds or is equal to the skew threshold value for the duration of the qualified time. The qualified time is measured in terms of device, machine, or CPU processing cycle time within the parallel environment and not in terms of wall clock. Moreover, rules or metadata associated with the job/application being monitored may identify the qualification time limitation and its value.

The interval for the checks is fixed and configurable. In an embodiment, the fixed interval is defined within rules or other metadata associated with the job/application being monitored. It may also be that the duration of the fixed interval is communicated to the skew detection service 302 as a processing parameter or may be preconfigured within the skew detection service 302. In some cases, the fixed interval is changeable or communicated dynamically, such as one issued as an instruction to the skew detection service 302 from an administrator.

When no qualification time limitation exists, the skew detection service 302 may determine that the potential skew value is an exception when it exceeds or equals the skew threshold value for a given interval. As stated above, when the qualification time limitation does exists, then the potential skew value has to exceed or to equal the skew threshold value for an extended period of time represented by the qualification time and that is measured in terms of machine or CPU time and not wall clock.

When an exception is noted, the skew detection service 302 processes predefined exception steps associated with the exception; or raises, reports, or otherwise communicates the exception within the parallel processing environment where it is detected and processed by other services within the parallel processing environment.

One of ordinary skill in the art now fully appreciates how load balancing or skew problems may be more accurately detected within a parallel processing environment.

It is to be understood that the screenshot is presented for purposes of comprehension only and as one example. The embodiments of the invention are not tied to any particular presentation within the GUI tool.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

determining that a skew is to be calculated for a job being processed in parallel within a parallel processing environment;

identifying a first processor having a highest value for a measured metric with respect to remaining processors within the parallel processing environment; and calculating the skew as a difference value between the highest value and an average value, wherein the average value is determined as an average for the measured metric associated with the first processor and the remaining processors.

2. The method of claim 1, wherein determining further includes resolving to calculate the skew at fixed intervals.

3. The method of claim 2, wherein resolving further includes identifying the fixed interval as a parameter identified within metadata associated with the job.

4. The method of claim 3 further comprising, acquiring or determining a skew threshold value or skew limit from within the metadata.

5. The method of claim 4 further comprising:

comparing the difference value to the skew threshold value; and communicating an exception when the difference value exceeds or is equal to the skew threshold value.

6. The method of claim 4 further comprising:

determining that the difference value exceeds or is equal to the skew threshold value;

recognizing a qualification flag indicating that the difference value has to exceed or be equal to the skew threshold value for a duration identified by a qualification time limitation in order for an exception to be determined; and determining whether a qualification time limitation has been exceeded and when it has been exceeded raising the exception.

7. The method of claim 1, wherein determining further includes recognizing that the skew calculation is to be performed for the job in response to a workload definition associated with a query, wherein the query is the job and it is submitted to a data store for processing and initially broken into steps for independent and simultaneous processing on the first and the remaining processors.

8. A method, comprising:

regularly checking for a potential skew at an interval on a plurality of processors within a parallel processing environment;

identifying the potential skew when a difference value between a highest loaded processor within the parallel processing environment and an average load within the parallel processing environment exceeds or is equal to a skew threshold; and deciding whether a qualification time exists when the potential skew is present and when the qualification time does exist, identifying the potential skew as an exception when the qualification time has been exceeded with the potential skew being present.

9. The method of claim 8 further comprising, recognizing that the qualification time does not exist and identifying the potential skew as the exception.

10. The method of claim 8 further comprising, processing or reporting the exception when detected.

11. The method of claim 8, wherein checking further includes determining whether processing load or I/O load for the plurality of processors within the interval warrant a designation as the potential skew.

12. The method of claim 8, wherein determining a particular load value as either a particular processor's utilization or the particular processor's Input/Output counts.

13. The method of claim 8, wherein deciding further includes monitoring the qualification time as overall device cycles for the parallel processing environment.

14. A system comprising:

a memory device configured to store a data store; and a processor in communication with the memory device, the processor configured to execute a skew detection service, wherein the skew detection service is invoked within a parallel processing environment when a job is issued to the data store, and wherein the skew detection service is configured to monitor the job and configured to perform one or more checks to determine if an exception occurs during a lifecycle of the job indicating that an imbalance with loads associated with processors of the parallel processing environment has occurred, and wherein the checks use a potential skew value as the difference between a highest loaded processor and an average load within the parallel processing environment.

15. The system of claim 14, wherein the skew detection service is further configured to identify the exception when the potential skew value exceeds or is equal to a skew threshold value.

16. The system of claim 14, wherein the skew detection service is further configured to identify the exception when the potential skew value exceeds or is equal to a skew threshold value and when the potential skew value remains for a qualified period of time.

17. The system of claim 16, wherein the qualified period of time is based on overall device processing cycles for the parallel processing environment.

18. The system of claim 14, wherein the skew detection service is further configured to monitor and perform one of the checks during a fixed interval.

19. The system of claim 18, wherein the fixed interval is configured within or dynamically communicated to the skew detection service as a processing parameter.

* * * * *